US009577513B2

(12) United States Patent
Feldtkeller et al.

(10) Patent No.: US 9,577,513 B2
(45) Date of Patent: *Feb. 21, 2017

(54) METHOD FOR OPERATING A POWER FACTOR CORRECTION CIRCUIT

(71) Applicant: Infineon Technologies AG, Neubiberg (DE)

(72) Inventors: Martin Feldtkeller, Munich (DE); Martin Krueger, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 195 days.

This patent is subject to a terminal disclaimer.

(21) Appl. No.: 14/499,507

(22) Filed: Sep. 29, 2014

(65) Prior Publication Data

US 2015/0015217 A1 Jan. 15, 2015

Related U.S. Application Data

(63) Continuation of application No. 13/084,588, filed on Apr. 12, 2011, now Pat. No. 8,912,775.

(51) Int. Cl.
*H02M 1/42* (2007.01)
*H02M 3/158* (2006.01)
*H02M 1/08* (2006.01)

(52) U.S. Cl.
CPC ......... *H02M 1/4208* (2013.01); *H02M 1/4225* (2013.01); *H02M 3/1584* (2013.01); *H02M 1/083* (2013.01); *Y02B 70/126* (2013.01)

(58) Field of Classification Search
CPC ...... H02M 1/083; H02M 1/42; H02M 1/4208; H02M 1/4225; H02M 3/1584; H02M 2003/1586
See application file for complete search history.

(56) References Cited

U.S. PATENT DOCUMENTS 6,091,233 A * 7/2000 Hwang ............... H02M 1/4258
323/222
6,690,589 B2 * 2/2004 Barnett ............... H02M 1/4225
323/272
(Continued)

FOREIGN PATENT DOCUMENTS

CN 1578078 A 2/2005
CN 1866704 A 11/2006
(Continued)

OTHER PUBLICATIONS

Huber et al., "Implementation of Open-Loop Control for Interleaved DCM/CCM Boundary Boost PFC Converters", Applied Power Electronics Conference and Exposition, 2008, 8 pages.
(Continued)

*Primary Examiner* — Fred E Finch, III
(74) *Attorney, Agent, or Firm* — Viering, Jentschura & Partner mbB

(57) ABSTRACT

A method for operating a power factor correction circuit is provided which may include the steps of providing a plurality of N switched-mode converter circuits each comprising an nth inductor, where N is at least 2, starting a switching pulse for the nth switched-mode converter circuit when the following conditions are fulfilled: the nth inductor of the nth switched-mode converter circuit has a predefined magnetization state; and a predefined time period has elapsed since the start of a switching pulse for an mth switched-mode converter circuit, where m=n−1 in case n>1 and m=N in case n=1. The predefined time period is a predefined fraction of the time period from the start of a previous switching pulse for the nth switched-mode converter circuit to a time when the nth inductor of the nth switched-mode converter circuit has the predefined magnetization state.

25 Claims, 8 Drawing Sheets

(56) References Cited

U.S. PATENT DOCUMENTS

| | | | | |
|---|---|---|---|---|
| 8,098,505 B1 * | 1/2012 | Choi | H02M 1/4225 | 323/272 |
| 8,441,822 B2 * | 5/2013 | de Groot | H02M 1/4225 | 323/207 |
| 8,476,879 B2 * | 7/2013 | Gaboury | H02M 1/4225 | 323/207 |
| 8,912,775 B2 * | 12/2014 | Feldtkeller | H02M 1/4208 | 323/207 |
| 2005/0017699 A1 | 1/2005 | Stanley | | |
| 2007/0253224 A1 * | 11/2007 | Cohen | H02M 1/4216 | 363/9 |
| 2008/0316783 A1 * | 12/2008 | O'Loughlin | H02M 1/4225 | 363/124 |
| 2009/0086514 A1 * | 4/2009 | Fornage | H02M 3/33507 | 363/21.17 |
| 2009/0257257 A1 * | 10/2009 | Adragna | H02M 3/1584 | 363/65 |
| 2010/0039088 A1 * | 2/2010 | Yang | H02M 1/42 | 323/288 |
| 2010/0097041 A1 * | 4/2010 | Ayukawa | H02M 1/4225 | 323/272 |
| 2010/0127671 A1 * | 5/2010 | Lidstrom | H02M 1/4225 | 323/207 |
| 2011/0110132 A1 * | 5/2011 | Rausch | H02M 1/4225 | 363/124 |
| 2011/0110133 A1 * | 5/2011 | Rausch | H02M 1/4225 | 363/124 |
| 2012/0014148 A1 * | 1/2012 | Li | H02M 1/4216 | 363/78 |
| 2012/0187929 A1 * | 7/2012 | Ohshita | H02M 3/1584 | 323/272 |

FOREIGN PATENT DOCUMENTS

| | | |
|---|---|---|
| CN | 101027832 A | 8/2007 |
| CN | 101120501 A | 2/2008 |
| CN | 101364763 A | 2/2009 |
| CN | 101986542 A | 3/2011 |
| WO | 2005120202 A2 | 12/2005 |
| WO | 2006046220 A1 | 5/2006 |

OTHER PUBLICATIONS

Xu et al., "Two-Phase Interleaved Critical Mode PFC Boost Converter With Closed Loop Interleaving Strategy", IEEE Transactions on Power Electronics, 2009, 12 pages, vol. 24, Issue 12.

Ku et al., "A Novel SFVM Control Scheme for Two-Phase Interleaved CCM/DCM Boundary Mode Boost Converter in Power Factor Correction Applications", Energy Conversion Congress and Exposition (ECCE), 2010, 6 pages.

* cited by examiner

METHOD FOR OPERATING A POWER FACTOR CORRECTION CIRCUIT

CROSS REFERENCE TO RELATED APPLICATION

This application is a continuation of U.S. patent application Ser. No. 13/084,588, which was filed Apr. 12, 2011. This application is incorporated herein by reference in its entirety.

TECHNICAL FIELD

Various embodiments relate generally to a power factor correction circuit. Moreover, various embodiments relate to a power factor correction circuit of an interleaved converter.

BACKGROUND

Circuits for power factor correction (hereinafter PFC) nowadays play an important role in current and/or voltage converters. For small to middle power ranges, e.g. 25 W to 150 W, power factor correctors working with currents of triangular shape are commonly used, wherein in each switching cycle a magnetic energy stored in an inductor is completely released and a new switching cycle is initiated immediately after the magnetic energy is completely released which can be detected via an auxiliary coil of the inductor. The advantage of power factor correctors relying on triangular currents is a relatively slow rate of current change in a rectifier which makes it possible to use inexpensive rectifying diodes. However, the drawbacks involved are the variable operation frequency and a high ripple of the input current. The latter issue can be resolved by using a power factor corrector working with currents of trapezoidal shape which is mostly used for power ranges between 150 W and 500 W. The operating frequency is usually fixed and is set by a clock generator. A major disadvantage of the use of a power factor corrector working with currents of trapezoidal shape is the need to use a relatively expensive fast rectifying diode.

To achieve even higher power ranges, multiphase power factor correctors working with currents of trapezoidal shape are used, where a multiphase clock generator provides the separate power factor correction stages with phase shifted clock signals which are phase shifted by 360°/N with respect to one another, wherein N denotes the number of power factor correction stages which is also equivalent to the number of different phases.

Over the past, multiphase power factor correctors working with currents of triangular shape have become increasingly attractive and partly replace single phase power factor correctors working with currents of trapezoidal shape in some applications in the range starting from 150 W. The multiphase power factor correctors working with currents of triangular shape offer several advantages over single phase power factor correctors working with currents of trapezoidal shape. The switching losses are considerably lower, which for example allows for a higher operating frequency and in turn may result in smaller magnetic components or a higher efficiency. As the magnetic components may have a decreased height, the overall circuitry can be constructed in a more compact fashion and hence their integration into flat screens, for example, may be simplified.

In case of an interleaved PFC circuit which includes more than one PFC stage working with currents of triangular shape, the synchronisation of PFC stages with respect to one another is a non-trivial task to be solved, since each PFC stage is a self-oscillating system which operates independent of a cycle generator.

In a conventional method to synchronise multiphase power factor correctors working with currents of triangular shape, two power factor correctors working with currents of triangular shape are operated independent of one another. Signals for setting the duration of the on-time of each power factor corrector stage are modulated depending on an averaged phase shift between the signals, such that by means of a phase control the power factor corrector stages reach a state of running out of phase. In another approach, a signal of a zero crossing detector of one of the two power factor corrector stages is delayed depending on an averaged phase difference between the two power factor corrector stages.

SUMMARY

According to various embodiments a power factor correction circuit (hereinafter PFC circuit) is provided. The PFC circuit may include a first switched-mode converter circuit having a first inductor, at least one second switched-mode converter circuit including a second inductor, a control circuit coupled to the first and second switched-mode converter circuits, wherein the control circuit is configured to start a switching pulse for the second switched-mode converter circuit when the conditions that the second inductor of the second switched-mode converter circuit has a predefined magnetization state and a predefined time period has elapsed since the start of a switching pulse for the first switched-mode converter circuit are fulfilled, wherein the predefined time period is a predefined fraction of the time period from the start of a previous switching pulse for the second switched-mode converter circuit to a time when the second inductor of the second switched-mode converter circuit has the predefined magnetization state.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Figure 1:
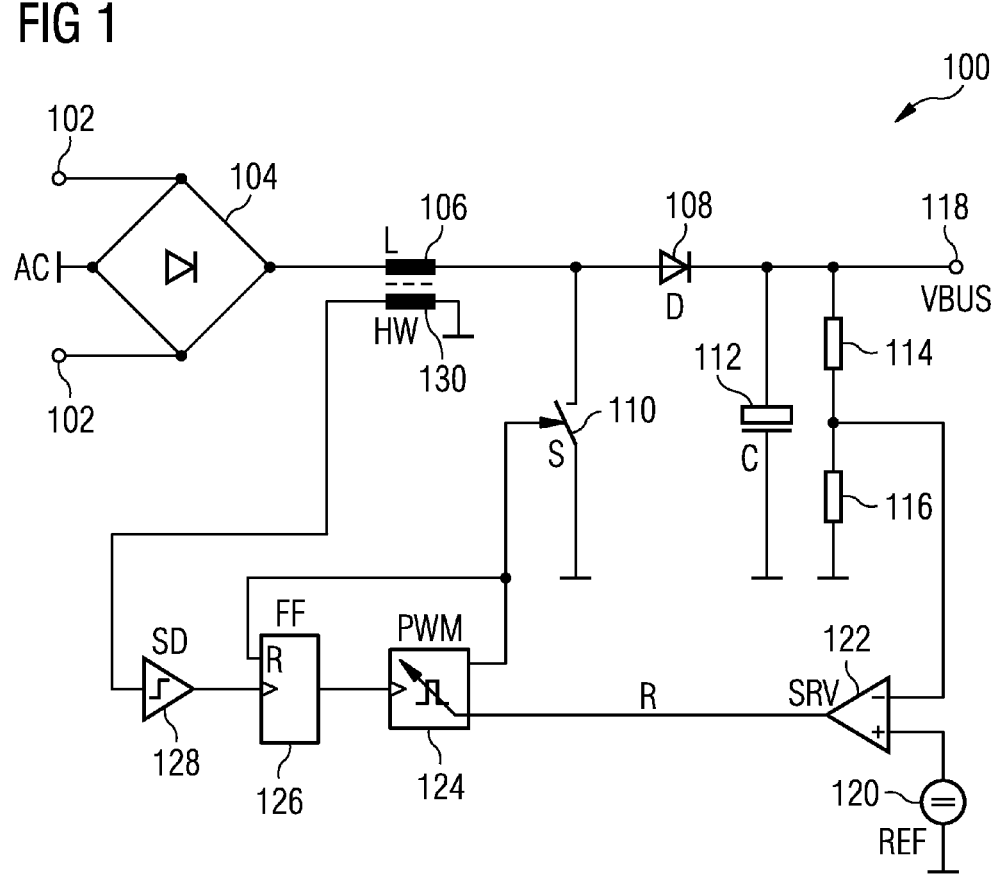
FIG. 1 shows an implementation of a single phase power factor corrector.

FIG. 1 shows an implementation of a single phase PFC circuit 100 working with currents of triangular shape. In the following, the structure of the PFC circuit 100 and its functionality will be outlined, as its understanding will be of avail for understanding the functionality of the power factor correction circuit according to various embodiments described in this application. This basic functionality will be referred to and is applicable throughout all the various embodiments which will be described in more detail below.

In various embodiments, the PFC circuit 100 may include at least one input 102 which is coupled to a rectifier 104. The rectifier 104 may include an arrangement of four diodes which is commonly referred to as a full-wave bridge rectifier. One output of the rectifier 104 is coupled to a reference potential, e.g. a ground potential, another output of the rectifier 104 is coupled to one end of a first inductor 106. The other end of the inductor 106 is coupled to an output 118 of the PFC circuit 100 via a diode 108. One side of a switch 110 is coupled to the electrical path between one end of the first inductor 106 and the diode 108, the other side of the switch 110 is coupled to the reference potential, e.g. to ground potential. One side of a capacitor 112 is coupled to the electrical path between the diode 108 and the output 118 of the power factor corrector circuit 100, the other side of the capacitor 112 is coupled to ground. One end of a voltage divider including a first resistor 114 and a second resistor 116 coupled in series is coupled to the output 118 of the power factor corrector circuit 100, the other side thereof is coupled to the reference potential, e.g. the ground potential. A tap arranged between the first resistor 114 and the second resistor 116 is coupled to a first input of a regulator 122. The regulator 122 may be a regulating amplifier with a differential input. For example, the regulator 122 may be configured as a proportional-integral (PI) controller with a delay and may have a PIT 1 filter characteristic. A second input of the regulator 122 is coupled to an output of a voltage source 120, which is configured to provide a reference voltage. An output of the regulator 122 is coupled to an first input of a pulse generator 124. A second input of the pulse generator 124 is coupled to an output of a memory element 126. A first input of the memory element 126 is coupled to an output of a threshold detector 128. An input of the threshold detector 128 is coupled to one end of an auxiliary inductor 130 which is inductively coupled to the inductor 106. The other end of the auxiliary inductor 130 is coupled to the reference potential, e.g. the ground potential. An output of the pulse generator 124 is coupled to a control input of the switch 110 and to a second input of the memory element 126. The output of the pulse generator 124 may be coupled to the control input of the switch 110 via a gate driver (not shown).

AC- or DC-voltage (or equivalently AC- or DC-current) applied to the at least one input 102 of the PFC circuit 100 may be first filtered by an electromagnetic interference filter (not shown) and then rectified by the rectifier 104. The rectified voltage is applied to one end of the inductor 106 which serves as an energy reservoir and the voltage is then provided at the output 118 of the PFC circuit 100 via the diode 108. The inductor 106, the diode 108, the switch 110 and the capacitor 112 form basic components of a boost power stage, also referred to as a step-up converter, which is configured to convert a DC-voltage into a DC-voltage of a higher value. The capacitor 112 is provided as an energy reservoir and may serve for reducing the ripple of the output voltage provided at the output 118 of the PFC circuit 100.

The output voltage of the PFC circuit 100 is sampled via the resistive voltage divider including the first resistor 114 and the second resistor 116 and compared to a reference voltage by the regulator 122. A signal indicating the deviation of the compared signals is transmitted to the pulse generator 124 and is used for setting the pulse width of the pulses generated by the pulse generator 124. The pulses generated by the pulse generator 124 are transmitted to the control input of the switch 110 and control the state of the switch 110. That is, depending on the value of the signal transmitted from the pulse generator 124 to the switch 110, the switch 110 is either opened (i.e. set in a non-conducting state) or closed (i.e. set in a conducting state). The pulse generator 124 is further configured to receive a signal from the memory element 126, which may be implemented as a flip-flop such as e.g. an RS flip-flop. The signal stored in the memory element 126 corresponds to the signal transmitted from the threshold detector 128 to the memory element 126. The threshold detector 128 together with the auxiliary inductor 130 is configured to detect a state in which the inductor 106 is completely demagnetized. Upon a complete demagnetization of the inductor 106 the polarity of the voltage in the auxiliary inductor 130 is reversed. This reversal of voltage is detected by the threshold detector 128 as a zero crossing of the voltage and a corresponding signal indicating the state of the inductor 106 is transmitted to the memory element 126 and stored therein. The signal stored in the memory element 126 is passed to the pulse generator 124 and triggers a generation of a signal pulse, the width of which is adjusted on the basis of the signal received by the pulse generator 124 from the regulator 122. In the PFC circuit 100, the pulse is generated immediately after the memory element 126 is set, i.e. immediately after the memory element 126 has received a signal from the threshold detector 128 indicating that the inductor 106 has reached the state of complete demagnetization. The pulse signal from the pulse generator 124 is transmitted to the control input of the switch 110 which is switched into a state different from the state it was in before receiving the pulse signal from the pulse generator 124. The switch remains in that state for a time period which is equal to the duration of the pulse signal received from the pulse generator 124. After the time period equal to the duration of the pulse received from the pulse generator 124 the switch returns to the state it was in before receiving the pulse from the pulse generator 124. The pulse signal of the pulse generator 124 also causes the memory element to be reset, i.e. to return to a state it was in before receiving the signal from the threshold detector 128 indicating the state of the inductor 106. Therefore, the memory element 126 is practically reset immediately after it has been set. The time period during which the memory element 126 remains set is mainly defined by "parasitic" delays, for example switching times of the pulse generator 124 and/or the memory element 126 itself and/or signal transmission delays.

Figure 2:
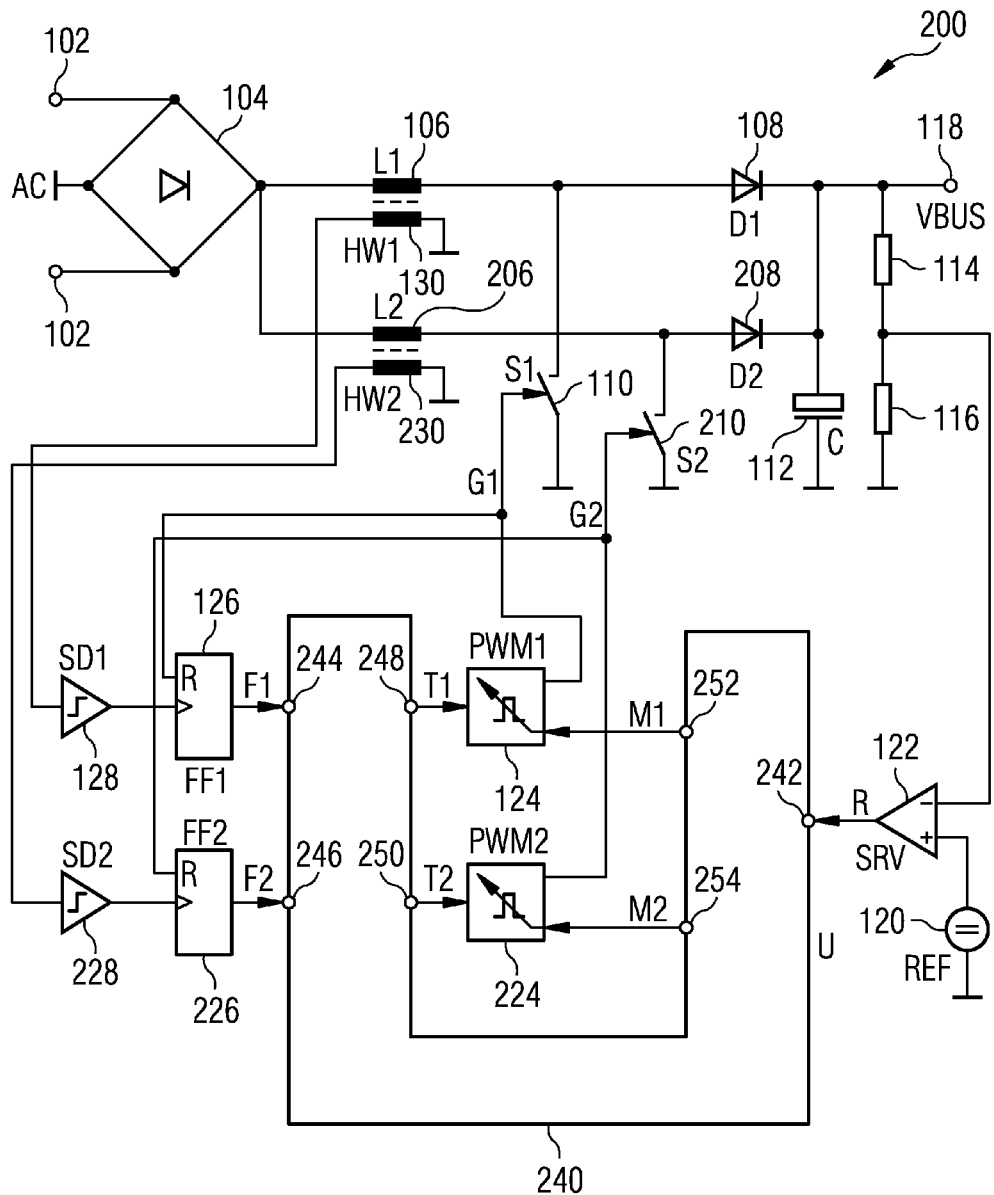
FIG. 2 shows an implementation of a two-phase power factor corrector according to various embodiments.

FIG. 2 shows an implementation of the PFC circuit 200 in accordance with various embodiments. The PFC circuit in FIG. 2 may be obtained by combining two PFC circuits 100 as shown in FIG. 1. Therefore, with respect to the basic components and their functionalities, reference is made to the description of FIG. 1 above. The implementation of the PFC circuit 200 shown in FIG. 2 corresponds to a two-phase implementation of the PFC circuit according to various embodiments which includes two independent switched-mode converter circuits (converter circuit in the following).

In the PFC circuit 200 a first switched-mode converter circuit is formed by the PFC circuit 100 shown in FIG. 1 and therefore its components are referenced with the same reference numbers. However, the at least one input 102, the rectifier 104 (and possible further circuit modules such as an EMI filter not shown), the capacitor 112 the first resistor 114, the second resistor 114, the regulator 122, the voltage source 120 and the output 118 (see FIG. 1) are shared components which are shared with a second switched-mode converter which in essence corresponds to the PFC circuit 100 shown in FIG. 1 with the difference that the shared components just listed are left out as they are shared by both converter circuits and need to be provided only once in the PFC circuit 200. In the following, components allocated to a respective switched-mode converter circuit will be distinguished by adding the terms "first" and "second". Shared components within the PFC circuit 200 are excluded from this convention, as they cannot be allocated to a respective switched-mode converter circuit. As can be taken from FIG. 2, the other output of the (shared) rectifier 104 is coupled to one end of the first inductor 106 and to one end of a second inductor 206, the other end of the first inductor 106 and the other end of the second inductor 206 are both coupled to the (shared) output 118 of the PFC circuit 200 via the first diode 108 and a second diode 208, respectively. In other words, the first switched-mode converter circuit and the second switched-mode converter circuit are coupled in parallel between the at least one (shared) input 102 and (shared) output 118 of the PFC circuit 200, wherein only one (shared) capacitor 112 and one (shared) voltage control circuit including the first (shared) resistor 114, the second (shared) 116 resistor, the (shared) regulator 122 and the (shared) voltage source 120 are provided.

Components allocated to the second switched-mode converter are labelled with reference numbers having the form 2xx (except a component labelled with reference number 240 including its terminals labelled with reference numbers 242 to 254 which is also a shared component and will be explained below), i.e. 206, 208 and so forth, wherein the last two digits coincide with the last two digits of a reference number of an equivalent component of the first switched-mode converter circuit, i.e. the second inductor 206 corresponds to the first inductor 106, a second threshold detector 228 corresponds to the first threshold detector 128 and so forth.

The PFC circuit 200 further includes a control circuit 240. Due to the provision of the control circuit 240, the interconnections within the first and second switched-mode converter circuit are altered with respect to the PFC circuit 100 shown in FIG. 1. The control circuit 240 includes a first input 242 to which the output of the (shared) regulator 122 is coupled. A first output 252 provided in the control circuit 240 is coupled to the first input of the first pulse generator 124. A second output 254 provided in the control circuit 240 is coupled to a first input of the second pulse generator 224. The output of the first memory element 126 is coupled to a second input 244 provided in the control circuit 240. The output of the second memory element 226 is coupled to a third input 246 provided in the control circuit 240. A third output 248 provided in the control circuit 240 is coupled to the second input of the first pulse generator 124. A fourth output 250 provided in the control circuit 240 is coupled to the second input of the second pulse generator 224.

In the following, the functionality of the control circuit 240 will be described, which is mainly responsible for adjusting the phase difference between the operation of the first converter circuit and the second converter circuit in the given example of a two-phase PFC circuit 200. In the two-phase PFC circuit 200, the first switched-mode converter and the second switched-mode converter are configured to operate with a phase difference of 180° with respect to each other after synchronisation.

In order to explain the operation of the control circuit 240, signals of the PFC circuit 200 will be analyzed. All the signals to be defined in the following are also marked in the implementation of the embodiment of the PFC circuit 200 according to various embodiments shown in FIG. 2.

FIGS. 3A to 3K show sequences of signals at various interfaces of the PFC circuit 200. In each diagram, the time base which is the same for all signals is represented by horizontal x-axis. An actual scaling of the values and the time bases of the signals will be omitted. Distinct times which will be referred to in the following are marked by dotted lines intersecting all x-axes. The y-axes in every diagram 3A to 3K are labelled with "0" representing a zero value or level of a respective signal, "H" representing a positive high value or level of a respective signal and "−H", where reasonable, representing a negative high value or level of a signal. Counting from top to bottom, a representation 302 of the current flowing through the first inductor 106, also labelled as I(L1), is shown in a first diagram 300 in FIG. 3A, a representation 320 of the current flowing through the second inductor 206 is also labelled as I(L2) and is shown in a fifth diagram 318 in FIG. 3E. An output voltage 306 of the first auxiliary inductor 130, also labelled as U(HW1), is shown in a second diagram 304 in FIG. 3B, an output voltage 324 of the second auxiliary inductor 230, also labelled as U(HW2), is shown in a sixth diagram 322 in FIG. 3F. The signal 310 stored in and output by the first memory element 126, also labelled as F1, is shown in a third diagram 308 in FIG. 3C, the signal 328 stored in and output by the second memory element 226, also labelled as F2, is shown in a seventh diagram 326 in FIG. 3G. The signals F1, F2 correspond to signals emitted by the first and the second threshold detector 128, 228, respectively, as the memory elements serve for storing or memorizing the received signal value and passing it on to their respective output. A signal 312 provided at the third output 248 of the control circuit 240, also labelled as T1 is shown in the third diagram 308 (together with the signal F1) in FIG. 3C, a signal 332 provided at the fourth output 250 of the control circuit 240, also labelled as T2, is shown in an eighth diagram 330 in FIG. 3H. As will be explained in more detail below, the signal T1 and the signal T2 provided by the control circuit 240 are trigger signals which enable the first pulse generator 126 and the second pulse generator 226, respectively, to output the pulse signal. The output signal provided by the first pulse generator 124, also labelled as G1, is shown in a fourth diagram 314 in FIG. 3D, the output signal provided by the second pulse generator 224, also labelled as G2, is shown in a ninth diagram 334 in FIG. 3I. The signal G1 and the signal G2 are provided to the control input of the first switch 110 and the second switch 210, respectively, and may alter the state of the respective switch, i.e. set it into a conducting state or into a non-conducting state. The signal G1 and the signal G2 are also provided to the second input of the first memory element 126 and the second input of the second memory element 226, respectively, as reset signals, i.e. they cause the respective memory element to be reset. In a tenth diagram 338 in FIG. 3J and in an eleventh diagram 344 in FIG. 3K, ramp signals are shown which are generated by the control circuit 240. A ramp signal 340, also labelled R11, in diagram 338 in FIG. 3J and a ramp signal 346, also labelled R12, in diagram 344 relate to the first switched-mode converter circuit, a ramp signal 342, also labelled R22, in diagram 338 in FIG. 3J and a ramp signal 348, also labelled R21, in diagram 344 in FIG. 3K relate to the second switched-mode converter circuit. The slew rate of the ramp signals of a respective switched-mode converter circuit may differ by a factor of N, wherein N denotes the number of switched-mode converter circuits provided in the PFC circuit. Hence, in various embodiments of the two-phase PFC circuit 200 including two switched-mode converter circuits the slew rates of the two ramp signals of a respective switched-mode converter circuit differ by a factor of 2, i.e. the slew rate of the ramp signal R11 may be twice as fast as the slew rate of the ramp signal R12 and the slew rate of the ramp signal R21 may be twice as fast as the slew rate of the ramp signal R22. Thus, in other embodiments, in which three phases (i.e. three converter circuits) are provided, the slew rate of the one ramp signal of one phase (i.e. of one converter circuit) may be three times as fast as the slew rate of the other ramp signal of that same phase (i.e. of that same converter circuit). In yet further embodiments, in which four phases (i.e. four converter circuits) are provided, the slew rate of the one ramp signal of one phase (i.e. of one converter circuit) may be four times as fast as the slew rate of the other ramp signal of that same phase (i.e. of that same converter circuit). Speaking in general terms, in an embodiment in which N phases (i.e. N converter circuits) are provided, the slew rate of the one ramp signal of one phase (i.e. of one converter circuit) may be N times as fast as the slew rate of the other ramp signal of that same phase (i.e. of that same converter circuit).

In the exemplary scenario for the sequences of signals shown in FIGS. 3A to 3K the first switched-mode converter circuit operates as a single-phase PFC circuit. Therefore, when the first inductor 106 is completely demagnetized, indicated by the signal I(L1) returning to its zero value, the voltage U(HW1) at the auxiliary coil 130 is reversed, i.e. features a zero-crossing shortly before a time t1, which is detected by the first threshold detector 128. Upon detection of this event (i.e. state where the first inductor 106 is completely demagnetized) the first threshold detector 128 outputs a signal indicating that the first inductor 106 is completely demagnetized. This signal is stored in the first memory element 126 and (neglecting switching times) simultaneously output by the first memory element 126 as signal F1 at the time t1. As can be seen in the third diagram, the signal T1 output by the control circuit 240 coincides with the signal F1 received by the control circuit 240. The signal T1 which is a trigger signal is output by the control circuit 240 and transmitted to the input of the first pulse modulator 124 and triggers the first pulse modulator 124 to output at time t1 the pulse signal G1 which is shown in diagram 314 in FIG. 3D. The pulse signal G1 (e.g. its rising edge) resets the first memory element 126 which is indicated by the signal F1 returning to its zero value, in this case after a negligible on-time. Therefore, the signal F1 has the form of a sharp peak 350. As long as the pulse signal G1 output by the first pulse generator 124 retains its high value, the first switch 110 remains in its conducting state and the first inductor 106 is magnetized which is represented by an increasing current I(L1) starting at time t1 or t4 in diagram 300 in FIG. 3A, for example. Whenever the trigger signal T1 is output by the control circuit 240, the ramp signals R11 and R12 are reset. The ramp signals R11 and R12 are configured to track cycles of the first inductor 106. When the inductor 106 is completely demagnetized, for example at times t1 and t4, the ramp signal R11 and the ramp signal R12 reach their high value H1 in diagram 338 in FIG. 3J and in diagram 344 in FIG. 3K, respectively, and are reset to their zero value and begin to track the next cycle of the first inductor 106 again. The resetting and starting of the ramp signals R11 and R12 takes place simultaneously (when signal transmission times and switching times are neglected).

Now the synchronisation process will be described which begins with the start or activation of the second converter circuit. The operation of the second converter circuit is initiated at a time t0 which is arbitrary. The operation of the second converter circuit from its activation until the second inductor 206 has reached the state of complete demagnetization, for example shortly before a time t2 or t5, is analogous to the operation of the first converter circuit and will not be described again. Only differences will be described which result from the fact that the first switched-mode converter circuit and the second switched-mode converter circuit are controlled by the control circuit 240 in such a way that eventually a phase shift of 360°/N being equal to 180° in this exemplary embodiment of a two-phase PFC circuit 200 is introduced between the two converter circuits. This synchronisation process may be completed within two cycles and its duration is independent of the actual time t0, where the second converter circuit is activated.

After the activation of the second switched-mode converter circuit, the second condition is introduced which has to be satisfied, when a new pulse is to be output by a pulse generator. At time t1, when the first pulse generator 124 would normally (i.e. in the case of a single-phase PFC) output a pulse signal G1 initiating a new cycle for the first inductor 106 (which has been completely demagnetized) the ramp signal R12 is compared to the ramp signal R21. As can be taken from diagram 344 in FIG. 3K, at time t1 the ramp signal R21 is bigger than the ramp signal R12. The ramp signal R21 being bigger than the ramp signal R12 indicates that the phase of first converter circuit precedes the phase of the second converter circuit by no more than 360°/N, i.e. 180° in this example, which is due to the fact that the slew rates of the ramp signals R12 and R21 also differ by a factor of N, i.e. 2 in this example. Therefore, the first converter circuit continues its operation in the way described above, i.e. without any delay or wait time.

At a time t2 (or shortly before the time t2), the second inductor 206 reaches a state of complete demagnetization (equivalent to the state of the first inductor 106 at time t1). At the time t2, in analogy to the first converter circuit, the second memory element 226 receives a signal from the second threshold detector 228 indicating a complete demagnetisation of the second inductor 206 and the value of the signal F2 is switched to its high value. At time t2, the ramp signals R11 and R22 are compared with the result that the ramp signal R11 is smaller than the ramp signal R22 as can be seen diagram 338 of FIG. 3J. Due to this result, the second converter circuit is halted, e.g. it might be frozen in its current state of the second inductor 206 being completely demagnetized with the ramp signals being stopped. That is, the ramp signals R22 and R21 of the second converter circuit remain at their peak values. The operation of the second converter circuit is not continued until the trigger signal T2 is output by the control circuit 240. However, the trigger signal T2 is the result of an AND-conjunction of the signal F2 from the second memory element 226 and of the comparison of the two ramp signals R11 and R22. In other words, the trigger signal T2 will be generated by the control circuit 240 only when the second inductor 206 is demagnetized (corresponds to the first condition) and when the ramp signal R11 of the first converter circuit is at least equal to or greater than the ramp signal R22 of the second converter circuit (corresponds to the second condition). Therefore, at time t2 a new pulse signal G2 is not generated, but the control circuit 240 introduces a wait time or lag for the second switch circuit. The wait time within the context of this example is the time it takes the ramp signal R11 to catch up to the frozen ramp signal R22. As soon as the ramp signal R22 is equal to the ramp signal R11 as it is the case at time t3 in diagram 338 in FIG. 3J, the second condition is fulfilled and the control circuit generates a trigger signal T2 which causes the second pulse generator 224 to output at time t3 the pulse signal G2 at time t3 which is equivalent to a switch signal for the second switch 210. The switch signal G2 closes the switch 210 for a predefined amount of time (equal to the duration of the pulse signal G2, see diagram 334 in FIG. 3I) and at the same time resets the second memory element 226 such that its output signal F2 returns to its zero value (see time t3 in diagram 326 in FIG. 3G).

When the operation of the second switch circuit is reinitiated at time t3 after a wait time which in this example corresponds to the time difference between time t3 and time t2, the synchronisation is complete since the phase difference between the two converter circuits now equals 360°/N, i.e. 180° in this example, so that one switch circuit operates out of phase with respect to the other one. The wait time was introduced in order to allow the first switch circuit to further increase its phase difference to 360°/N, i.e. 180°, with respect to the second switch circuit. The comparison of phases is implemented via a comparison of ramp signals that differ in slew rate by a factor of N, i.e. 2 in this example. Requiring the ramp signal R11 to be equal to the value of the ramp signal R22, wherein the ramp signal R11 has a slew rate twice as high as the ramp signal R22, directly translates into requiring that the end of the cycle of the second switch circuit coincides with the middle of the cycle of the first switch circuit. This requirement defines an out of phase operation, when two converter circuits with equal cycles are considered.

A successful synchronisation which in this example corresponds to the presence of the desired phase shift of 180° between the first and second switch circuit manifests itself in the lack of wait times at points in time when the previously mentioned conditions are checked before a new pulse signal is output by a respective pulse generator for a corresponding switch circuit. In diagram 338 in FIG. 3J and in diagram 344 in FIG. 3K it can be seen that at time t5 no wait time is present for the second converter circuit and hence the ramp signal R22 and R21 are immediately started after being reset. By comparing the structure 352 of the signal F2 at the output of the second memory element in diagram 326 in FIG. 3G it can be seen that a wait time directly translates (neglecting switching and transmission times) into the time during which the memory element is set, i.e. where the signal F2 is held at its high value. In other words, a high level of the signal F2 represents the first condition, the comparison of ramp signals in the control circuit 240 represents the second condition. The respective trigger signal T1 or T2 is only generated when both conditions are satisfied. Simultaneously (when switching and transmission times are neglected) the memory element 126 or 226 is reset. Illustratively, the wait time during which the signal at the output of a respective memory element remains high corresponds to the time during which the first condition is fulfilled and the control circuit waits for the second condition to be fulfilled before allowing the corresponding waiting converter circuit to start a new cycle.

It is to be noted that the terms "first" and "second" used in relation with the first and second switched-mode converter circuit by no means imply a hierarchy in the operational mode of the PFC circuit 200 according to various embodiments. That is, the first and second switched-mode converter circuit are both independent converter circuits which are not subject to a master and slave relation. That is, the first converter circuit and the second converter circuit might be indistinguishable concerning their hardware implementation. The terms "first" and "second" referring to the respective converter circuit in the context of this application may be rather seen as terms referring to the temporal order in which the converter circuits are activated. However, the converter circuit activated first may be any one of the two in the case of the embodiment of a PFC circuit 200 shown in FIG. 2.

The example of signal sequences in FIGS. 3A to 3K represent the ideal case of two converter circuits operating at the same frequency. This however requires the components to have the same parameters which in real life is hardly achievable. Due to manufacturing tolerances involved, the pulse widths of the pulse signals of the converter circuits may differ from one another. The converter circuit having the shorter turn-on time would operate at a faster rate. The turn-on time of a converter circuit is the time during which a steadily increasing current flows through the corresponding inductor and during which the inductor's magnetic energy is constantly increasing. Generally speaking, under the assumption of a N-phase PFC circuit, the converter circuit with the shortest turn-on time, which will also reach the state of complete demagnetization the fastest, may have to wait for the other converter stages and will therefore will operate in discontinuous mode (which is generally detrimental to the overall efficiency of the PFC circuit). The discontinuous mode can be identified by a gap in time between the entering into the state of complete demagnetization and the beginning of a new control switch pulse for a given converter circuit of a multiphase PFC circuit. In order to improve efficiency, the gap is eliminated in the PFC circuit according to various embodiments over multiple cycles in an iterative manner. In order to eliminate the gap, the turn-on time of the converter circuit with the shortest turn-on time may be iteratively prolonged in small steps with respect to the turn-on times of the other one or more converter circuit(s), until the gap is eliminated. Exemplary pulse sequences of a two-phase PFC circuit including two converter circuits with different turn-on times where one of the converter circuits operates in discontinuous mode are displayed in FIGS. 4A to 4K.

In analogy to FIGS. 3A to 3K, a set of pulse sequences is shown in FIGS. 4A to 4K representing the same parameters in the same order of diagrams. Therefore the same reference numbers are used for the respective diagrams and the corresponding representations of the signals. However, in the case of the pulse sequences shown in FIGS. 4A to 4K, the turn-on time for the second inductor 206 is shorter than the turn-on time of the first inductor 106. The mechanism by which the signals shown in FIGS. 4A to 4K influence each other was already described with respect to the signal pulses shown in FIGS. 3A to 3K and will not be repeated as it is structurally the same.

In analogy to the scenario described in FIGS. 3A to 3K the operation of the second converter circuit is initiated at a time t0 which is arbitrary while the first converter circuit is already in operation. Shortly before times t6 and/or t9 the first inductor 106 reaches a state of complete demagnetization which manifests itself in short plateaus of the current signal I(L1) at zero level in diagram 300 in FIG. 4A. A comparison of the ramp signal R21 to the ramp signal R12 at times t6 and t9 yields the result that the ramp signal R21 is larger than the ramp signal R12 as can be seen in diagram 344 in FIG. 4K at time t6 and/or time t9. In analogy to the scenario presented in FIGS. 3A to 3K this means that the operation of the first converter circuit is preceding the operation of the second converter circuit by a phase which is not bigger than 180°. Therefore, the operation of the first converter circuit continues without any waiting time or lag being imposed on it. Shortly before times t7 and/or t10 the second inductor 206 reaches a state of complete demagnetization. However, since the ramp signal R11 is smaller than the ramp signal R22 at times t7 and/or t10, the second converter circuit is halted until the first inductor has increased its phase lead to 180°. This requirement is fulfilled at time t8 and/or t11, as can be seen in diagram 338 in FIG. 4J, where the ramp signal R11 has increased to the level of the ramp signal R22. Therefore, the respective time differences between time t7 and t8 and/or t10 and t11 correspond to wait times which are introduced before the pulse signal G2 is can be output by the control circuit 420 at times t8 and/or t11 (see signal structure in diagram 334 in FIG. 4I). The wait time lasting from time t7 to t8 and/or from time t10 to t11 also manifests itself in the form of short plateaus of the ramp signals R22 and R21 in diagram 338 in FIG. 4J and in diagram 344 in FIG. 4K at their high value H2. It is to be noted that each wait time is again equal to the time period the memory element remains set at its high value. i.e. each wait time of the second converter circuit is equal to the corresponding width of the rectangular pulses 352 featured by the signal F2 in diagram 326 in FIG. 4G.

In the underlying scenario represented by the signal pulses shown in FIGS. 4A to 4K the converter circuit with the longer turn-on time sets the operation frequency for the converter circuits within the PFC circuit and the converter circuit with the shorter turn-on time is adjusted such that it is forced to operate in a discontinuous mode. Thus, the desired phase difference of 180° between the two converter circuits can be established. However, in contrast to the scenario represented by signal pulses in FIGS. 3A to 3K, a wait time is required at the end of every cycle of the converter circuit having the shortest turn-on time in order to maintain the out of phase operation, as was explained with reference to FIGS. 4A to 4K.

According to various embodiments countermeasures may be taken in case the operation of one of the converter circuits of a PFC circuit requires repeated wait times while the other converter circuit operates without wait times. In such a case, the duration of the respective pulse signal generated by the corresponding pulse generator of the faster converter circuit can be prolonged with respect to the duration of the pulse generated by the pulse generator(s) of the slower converter circuit(s) in an iterative process. Since the sum of all N pulse signal durations of pulse signals generated by the N pulse generators is preset by an overlaying control circuit and hence may be kept constant, it is possible to prolong the pulse duration of the converter circuit requiring wait times or to reduce the pulse duration of the converter circuit operating without wait times or to adjust the pulse durations in an opposing manner (i.e. prolong the one, reduce the other) according to the frequency of the occurrence of wait times. This property may be useful for eliminating wait times that occur periodically in PFC circuits with more than two switched-mode converter circuits. In such a case, the pulse duration of each of the converter circuits where wait times occur can be prolonged, for example. Alternatively, only the pulse duration of the converter circuit with the longest wait time may be prolonged and in an opposing manner the pulse duration for converter circuits which momentarily do not require a wait time may be reduced.

Generally speaking, the process of synchronising PFC stages or converter circuits of a multiphase PFC circuit working with currents of triangular shape may be separated into several steps. At first, a time dependent signal (e.g. implemented by the means of a ramp signal or digital counter) is started in synchronization with the beginning of a control signal pulse defining the magnetization time of the inductor of a respective converter circuit. In various embodiments, that signal pulse is the signal pulse generated by the pulse generator. Then, the time dependent signal is stopped and/or the state or condition of the time dependent signal is stored (e.g. by switching off the current loading the ramp capacitor or storing the state, for example a digital data word, of a digital counter in a register) when the corresponding inductor is detected to have reached a state of complete demagnetization. As described above, the detection process may be implemented via the threshold detector configured to detect a reversal of voltage, i.e. a zero crossing thereof, across the auxiliary inductor. Upon stopping of the time dependent signal, the Nth part of the signal (with regard to its value) is compared to the time dependent signal of the other converter circuit the phase of which is preceding. In the above example half (Nth part, with N=2) of the ramp signal (ramp signal with normal slew-rate) of one converter circuit is compared to the ramp signal (ramp signal with double slew-rate) of the other converter circuit. If the divided or scaled down time dependent signal is smaller than or equal to the (undivided or not scaled down) time dependent signal of the other converter circuit the phase of which is preceding, a new control signal pulse is generated. With generation of the new control signal the time dependent signal is reset and restarted. In the other case, i.e. if the divided or scaled down time dependent signal is bigger than the (undivided or not scaled down) time dependent signal of the other converter circuit the phase of which is preceding, a wait time or lag is introduced until the (undivided or not scaled down) time dependent signal of the other converter circuit the phase of which is preceding has reached the divided or scaled down time dependent signal. At the end of the wait time, i.e. when the divided or scaled down time dependent signal and the (undivided or not scaled down) time dependent signal of the other converter circuit the phase of which is preceding are equal, a new control signal pulse is generated. With generation of the new control signal the time dependent signal is reset and restarted. In case a wait time has been introduced, the turn-on time of the corresponding converter circuit may be prolonged by a small fraction and/or the turn-on time of the other converter circuit may be reduced by a small fraction.

In other words, a new control signal pulse in a switched-mode converter circuit of a N-phase, i.e. multiphase with N phases, PFC circuit is generated when the following two conditions are satisfied:
  the inductor of the corresponding inductor is completely demagnetized (will be referred to as the first condition in the following), and
  the time that has passed since the beginning of a control signal pulse of the converter circuit the phase of which is preceding amounts to at least the Nth part of the time span between the start of the control signal pulse and the complete demagnetization of the inductor determined during the previous cycle (will be referred to as the second condition in the following).

The small fraction by which the turn-on times may be adjusted may correspond to the wait time itself or to an averaged wait time over more than one cycle of operation of the PFC circuit. The small fraction may also be a difference of the wait times of the converter circuits.

By using the frozen or saved divided, i.e. scaled down, time dependent signal in the comparison, the several converter circuits are synchronized very fast among each other, ideally within two operation cycles. When identical converter stages (with regard to components and their parameters) are used, they operate with a phase difference of 360°/N with respect to each other and wait times are not required, since identical operational parameters lead to equal turn-on times.

Figure 5:
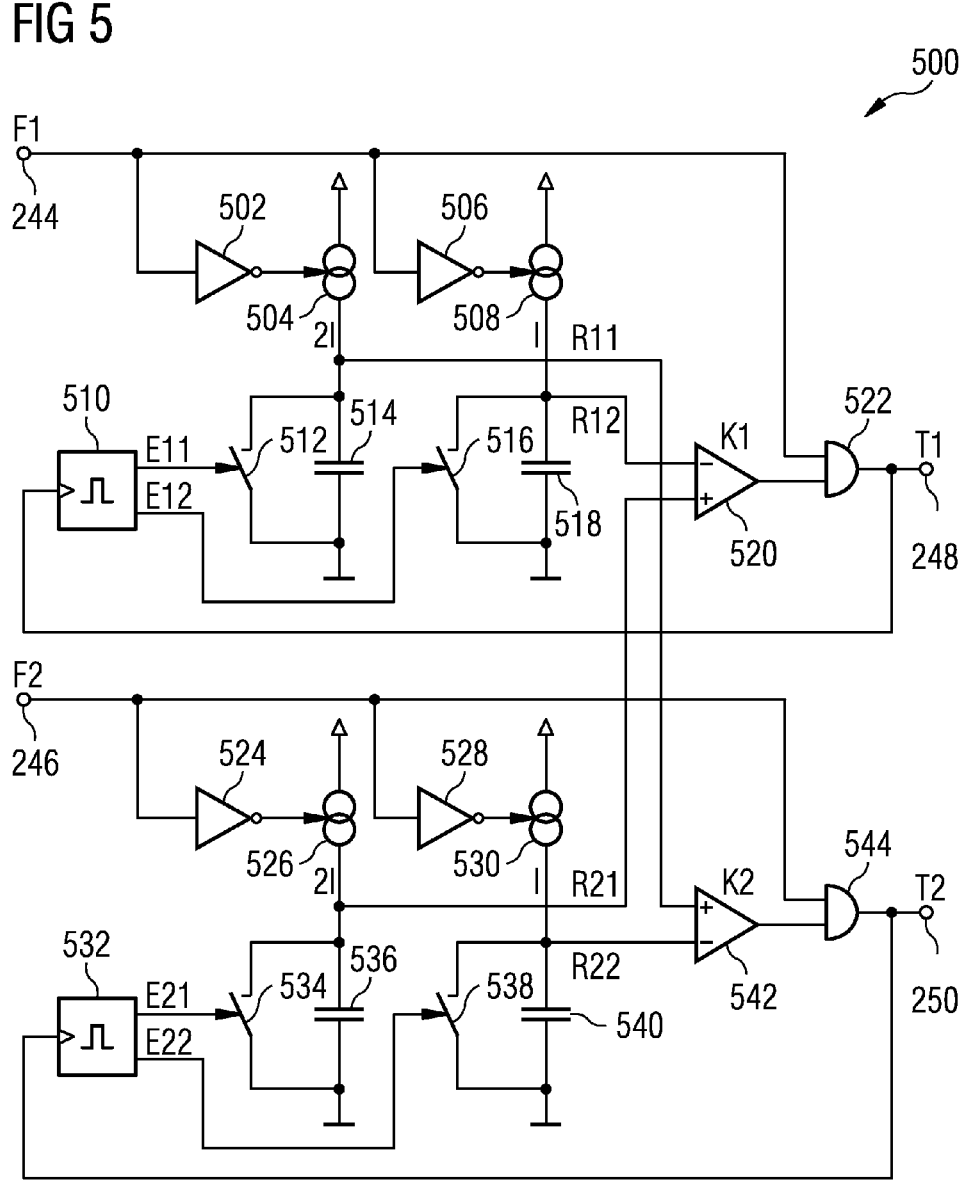
FIG. 5 shows an implementation of ramp generators within the control circuit according to various embodiments.

As described above, the comparison of the respective phases of the converter circuit of a PFC circuit is performed by comparing ramp signals within the control circuit 240. FIG. 5 shows an analog implementation of a ramp generation circuit 500 which may be provided in the control circuit 240 of the two-phase PFC circuit 200 of FIG. 2 and may be configured to generate the ramp signals for the respective converter circuits and the wait times as well.

The ramp generation circuit 500 may include a first inverter 502 and a second inverter 506 which are coupled to the second input 244 of the control circuit 240 (see FIG. 2). However, the first and the second inverters may be formed as one inverter as well. Further, the second input 244 of the control circuit 240 is coupled to one input of a first AND-gate 522. The first inverter 502 is coupled to a first current source 504 and is configured to turn the first current source 504 on or off, depending on the signal F1 provided from the first memory element 126. The first current source 504 is coupled to one side of a first capacitor 514, the other side of which is coupled to a reference potential. The second inverter 506 is coupled to a second current source 508 and is configured to turn the second current source 508 on or off, depending on the signal F2 provided from the second memory element 226. The first inverter 502 and the second inverter 506 are optional elements which are used to indicate that the corresponding first current source 504 and second current source 508 are operated in a contrasting manner with respect to the corresponding signal F1 from the first memory element. That is, in various embodiments, a high level of the signal F1 from the first memory element 126 in its set state may be transformed by the first converter 502 and the second converter 506 into a low level signal which represents a switched off state of the first current source 504 and the second current source 508. Similarly, a low level of the signal F1 from the first memory element 126 in its reset state may be transformed by the first converter 502 and the second converter 506 into a high level signal which represents a switched on state of the first current source 504 and the second current source 508. The contrasting way of operation of the current sources with respect to the signal from the corresponding memory elements is directly reflected, for example, in the short plateaus of the ramp signals R22 and R21 at their high value H2 (i.e. from time t7 to t8 and/or from time t10 to t11) in diagram 338 in FIG. 4J and in diagram 344 in FIG. 4K. As already mentioned, the short plateaus of the ramp signals which coincide with a high level of the corresponding signal from the memory element are time periods during which the ramp signals are halted, e.g. the corresponding current sources are switched off, and represent wait times introduced by the control circuit 240. The second current source 508 is coupled to one side of a second capacitor 518, the other side of which is coupled to a reference potential. A first discharge switch 512 is coupled in parallel to the first capacitor 514, a second discharge switch 516 is coupled in parallel to the second capacitor 518. A first output of a first discharge pulse generator 510 is coupled to a control input of the first discharge switch 512 to provide a discharge signal E11, a second output of the first discharge pulse generator 510 is coupled to a control input of the second discharge switch 516 to provide a discharge signal E12. An input of the first discharge pulse generator 510 is coupled to an output of the first AND-gate 522. The output of the first AND-gate 522 is further coupled to the third output 248 of the control circuit 240. Another input of the first AND-gate 522 is coupled to an output of a first comparator 520. An inverting input of the first comparator 520 is coupled to the electrical path between the second current source 508 and the second capacitor 518. In this way, a signal may be applied to the inverting input of the first comparator 520 which corresponds to the ramp signal R12. A non-inverting input of the first comparator 520 is coupled in an appropriate manner which will be described below to a second branch of the ramp generation circuit 500 such that the ramp signal R21 may be applied to the non-inverting input. The components just described form a branch of the ramp generation circuit 500 which may be allocated to the first converter circuit.

The ramp generation circuit 500 also includes the second branch which has a setup analogous to the first branch and may be allocated to the second converter circuit. That is, ramp generation circuit 500 may include a third inverter 524 and a fourth inverter 528 which are coupled to the third input 246 of the control circuit 240. However, the third and the fourth inverter may be formed as one inverter as well. Further, the third input 246 of the control circuit 240 is coupled to one input of a second AND-gate 544. The third inverter 524 is coupled to a third current source 526 and is configured to turn the third current source 526 on or off, depending on the signal F2 provided from the second memory element 226. The third current source 526 is coupled to one side of a third capacitor 536, the other side of which is coupled to a reference potential. The fourth inverter 528 is coupled to a fourth current source 530 and is configured to turn the fourth current source 530 on or off, depending on the signal F2 provided from the second memory element 226. With respect to the second branch of the ramp generation circuit 500 and the corresponding signals, the third inverter 524 and the fourth inverter 528 are also optional elements and are configured in the same way and serve the same purpose as the first inverter 502 and the second inverter 506 in the first branch of the ramp generation circuit 500. The fourth current source 530 is coupled to one side of a fourth capacitor 540, the other side of which is coupled to a reference potential. A third discharge switch 534 is coupled in parallel to the third capacitor 536, a fourth discharge switch 538 is coupled in parallel to the fourth capacitor 540. A first output of a second discharge pulse generator 532 is coupled to a control input of the third discharge switch 534 to provide a discharge signal E21, a second output of the second discharge pulse generator 532 is coupled to a control input of the fourth discharge switch 538 to provide a discharge signal E22. An input of the second discharge pulse generator 532 is coupled to an output of the second AND-gate 544. The output of the second AND-gate 544 is further coupled to the fourth output 250 of the control circuit 240. Another input of the second AND-gate 544 is coupled to an output of a second comparator 542. An inverting input of the second comparator 542 is coupled to the electrical path between the fourth current source 530 and the fourth capacitor 540. In this way, a signal may be applied to the inverting input of the second comparator 542 which corresponds to the ramp signal R22. A non-inverting input of the second comparator 542 is coupled to the electrical path between the first current source 504 and the first capacitor 514 in the first branch of the ramp generation circuit 500. In this way, a signal may be applied to the inverting input of the second comparator 542 which corresponds to the ramp signal R11.

As mentioned above concerning the first branch of the ramp generation circuit 500, the ramp signal R21 is applied to the non-inverting input of the first comparator 520 by coupling the non-inverting input of the first comparator 520 to the electrical path between the third current source 526 and the third capacitor 536 in the second branch of the ramp generation circuit 500.

Figure 3:
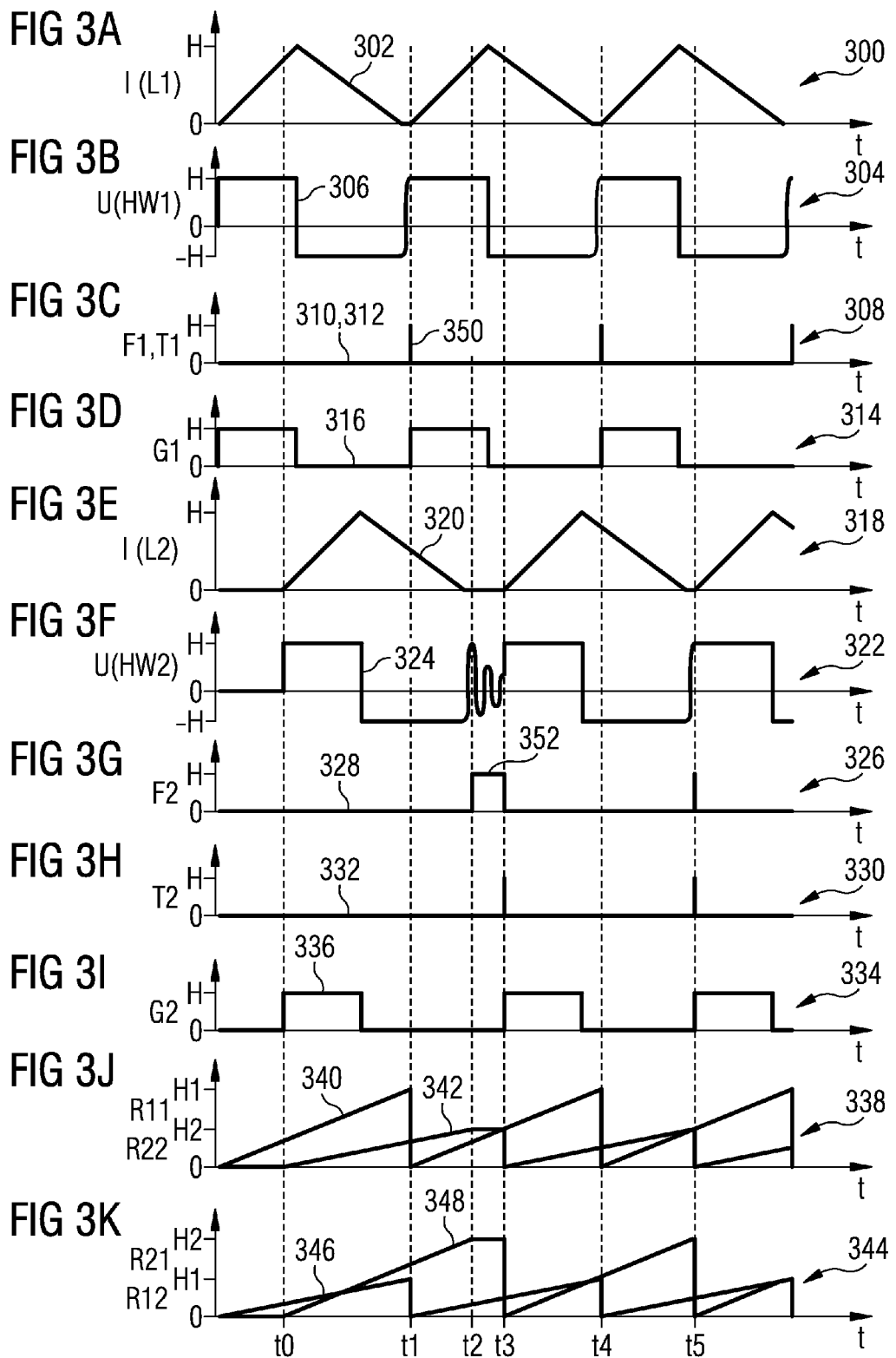
FIGS. 3A to 3K show signal sequences at various interfaces during operation of the two-phase power factor corrector of FIG. 2 according to various embodiments.
Figure 4:
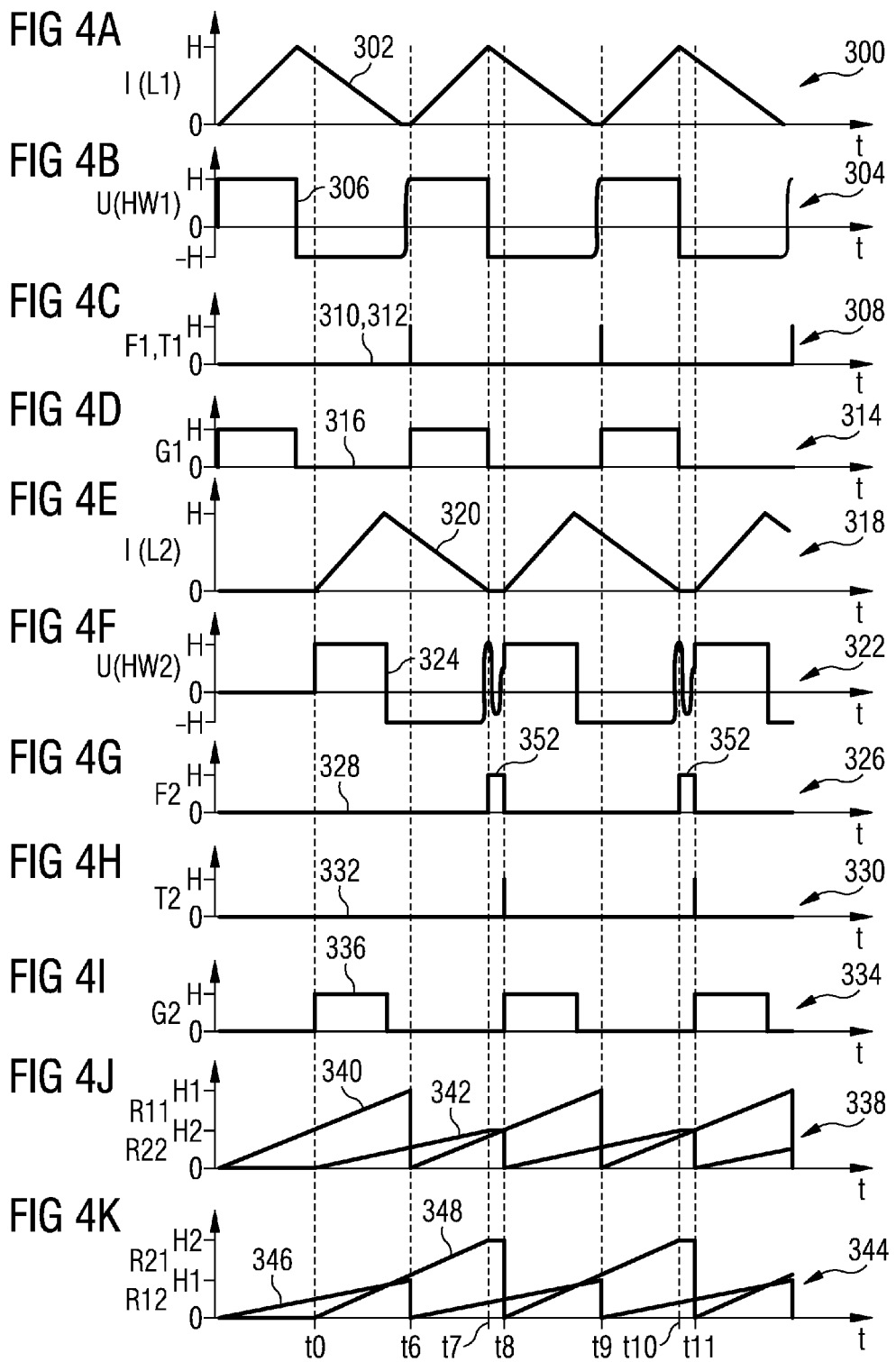
FIG. 4A to 4K show further signal sequences at various interfaces during operation of the two-phase power factor corrector of FIG. 2 according to various embodiments.

The ramp generation circuit 500 generates two ramp signals with slew rates at a ratio of 1:N, i.e. 1:2 in this example, for each converting circuit, i.e. ramp signal R11 and ramp signal R12 for the first converting circuit, wherein the ramp signal R21 has a slew rate twice as large as the ramp signal R11, and ramp signal R22 and ramp signal R21, wherein ramp signal R21 has a slew rate twice as large as the ramp signal 22 (see FIGS. 3J and 3K and/or FIGS. 4J and 4K). In this embodiment, the capacitances of all four capacitors 514, 518, 536, 540 are equal and the loading currents provided by the respective current source have a ratio of 1:2. Alternatively, the current sources may provide equal currents and the capacitances of capacitors in each branch may have a ratio of 1:2. According to various embodiments, only one ramp signal may be generated and provided to a voltage follower and then divided via a resistive divider. Also, the one generated ramp signal may be amplified with an amplifier by a factor of two.

With the occurrence of a rising edge of the trigger signals T1 or T2 (alternatively, the signal G1 and the signal G2 in FIG. 2 may be considered), the first capacitor 514 and the second capacitor 518 or the third capacitor 534 and the fourth capacitor 540 are discharged with respective discharge pulses. The discharging is performed by setting the respective two discharge switches into their conducting state. Immediately after the discharging process, the loading process begins, during which both discharge switches belonging to a respective converting circuit remain in an non-conducting state. The closing of the respective two discharge switches and their immediate opening corresponds to a reset of both ramps of a respective converting circuit, as already described.

The two current sources of a respective converting circuit remain active as long as the corresponding (i.e. first or second) memory element is not set, i.e. as long as the corresponding inductor is not completely demagnetized. As soon as the respective memory element is set, i.e. as soon as the corresponding threshold detector detects the corresponding inductor to enter a state of total demagnetization, the corresponding two current sources are switched off by the corresponding two inverters. In consequence the corresponding two capacitors cease to be charged further, however, they remain charged. This process corresponds to the freezing of the ramp signals, as described with respect to FIG. 2 and FIGS. 3A to 3K.

The comparators 520 and 542 are provided for comparing the respective ramp signals. That is, the first comparator 520 in the first branch of the ramp generation circuit 500 compares the ramp signal R12 of the first converting circuit having a normal slew rate to the ramp signal R21 of the second converting circuit having the double slew rate. In analogy, the second comparator 542 in the second branch of the ramp generation circuit 500 compares the ramp signal R11 of the first converting circuit having the double slew rate to the ramp signal R22 of the second converting circuit having a normal slew rate. Only when the ramp signal R21 is equal to or larger than the ramp signal R12 the first AND-gate 522 will generate the trigger signal T1. In analogy, only when the ramp signal R11 is equal to or larger than the ramp signal R22 the second AND-gate 522 will generate the trigger signal T2. As described in the context of FIG. 2 and FIGS. 3A to 3K, the trigger signals T1 and T2 cause the corresponding pulse generator 124 or 224 to output the corresponding pulse signal G1 or G2.

Ramp signals generated with current sources and capacitors normally cannot be reset and restarted at the same time. A viable solution to this circumstance will be described in the following with respect to FIGS. 6A to 6C.

In order to reset and restart the ramp signals R11 and R12 or R21 and R22 of a corresponding converter circuit, the first and second capacitor 514, 518 or the third and fourth capacitor 536, 540 may be discharged via the first and second discharge switch 512, 516 or the third and fourth discharge switch 534, 538, wherein each of the two pairs of discharge switches may remain in a conducting state for different amounts of time, i.e. be configured to provide different on-times. The on-times of the discharge switches are reciprocal to the corresponding slew-rates of the ramp signals. In other words, the shorter the on-time of a respective discharge switch, the higher the slew-rate of a corresponding ramp signal will be and vice versa.

Figure 6A:
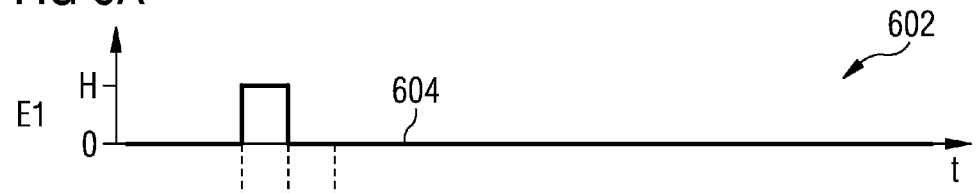
FIGS. 6A to 6C show a set of signal sequences at various interfaces during operation of the two-phase power factor corrector according to various embodiments.
Figure 6B:
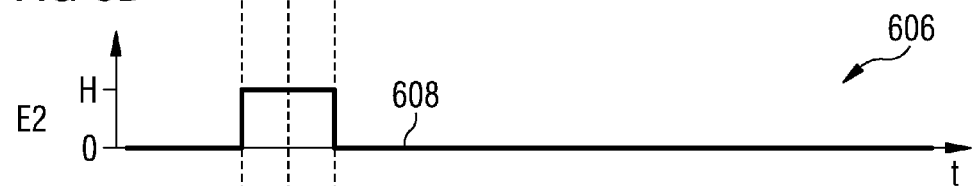
Figure 6C:
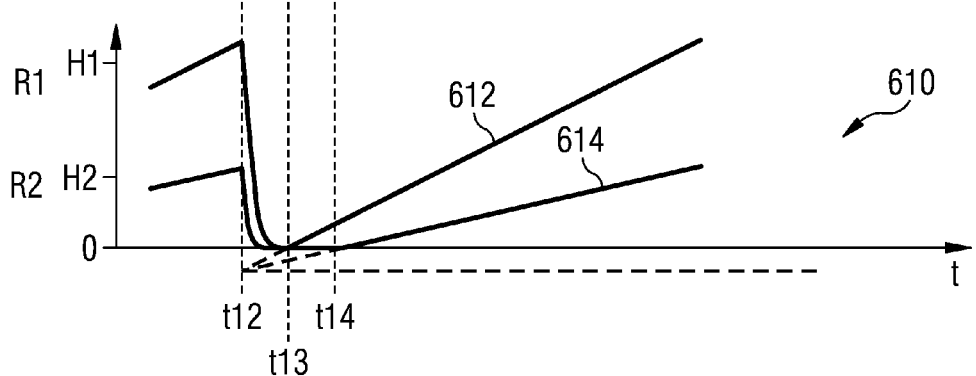

This circumstance is depicted in FIGS. 6A to 6C. A first discharge signal 604, also labelled E1, is shown in a first diagram 602 in FIG. 6A, a second discharge signal 608, also labelled E2, is shown in a second diagram 606 in FIG. 6B. A first ramp signal 612, also labelled R1, and a second ramp signal 614, also labelled R2, are shown in a third diagram 610 in FIG. 6C. The generic first and second discharge signal E1 and E2 may represent one pair of corresponding discharge signals E11, E12 or E21, E22 of a corresponding converter circuit that have been introduced in the context of FIG. 5 and the generic first and second ramp signal R1 and R2 may represent one pair of corresponding ramp signals R11, R12 or R21, R22 related with a corresponding converter circuit. In each diagram, the time base which is the same for all signals is represented by horizontal x-axis. An actual scaling of the value of the signals as well as of the time basis is not relevant for the explanation and is therefore omitted. Distinct times which will be referred to in the following are marked by dotted lines intersecting all x-axes. The y-axes in every diagram are labelled with "0" representing a zero value of a respective signal, "H" representing a positive high value of a respective signal.

As can be seen in diagram 602 in FIG. 6A and in diagram 606 in FIG. 6B, the first and second discharge signals E1 and E2 are both set to a high value at a time t12. This means that corresponding discharge switches are closed such that the corresponding capacitors (e.g. first capacitor 514 is discharged by the first discharge switch 512 and so forth, see FIG. 5) are discharged. In effect, the first and second ramp signals are reset which manifests itself in both the first ramp signal R1 and the second ramp signal R2 dropping from their respective high values H1 and H2 to zero. After certain times both the first and second discharge signal E1 and E2 return to zero whereby corresponding discharge switches are opened, i.e. set in a non-conducting state. The current sources 504, 508 or 526, 530 in FIG. 5 provide the corresponding capacitors 514, 518 or 536, 540 with currents such that the ramps R11, R12 or R21, R22 are effectively restarted. However, the duration of the first discharge pulse E1 is shorter than the duration of the second discharge pulse E2. Therefore, the first ramp signal R1 in diagram 610 in FIG. 6C starts to rise from zero at a time t13 whereas the second ramp signal R2 in diagram 610 in FIG. 6C starts to rise from zero at a time t14. When the graphs of both ramp signals R1 and R2 are linearly extended beyond zero to negative values, it seems that both ramp signals R1 and R2 are started at a common origin at time t12 in diagram 610 in FIG. 6C. However, at time t12 discharging of the capacitors is initiated. Since the on-times of the discharge switches are reciprocal to the corresponding slew-rates of the ramp signals, the slew-rate of the second ramp signal R2 is lower than the slew-rate of the first ramp signal R1 as the first discharge signal pulse E1 is shorter than the second discharge signal pulse E2.

The duration of the longer discharge pulse (second discharge signal pulse E2 in diagram 606 in FIG. 6B in this example) may be preferably chosen such that during the on-time of the discharge switch, i.e. during the time the discharge process is progress, no comparison of the corresponding ramp signal (second ramp signal R2 in diagram 610 in FIG. 6C in this example) to another ramp signal is to be performed. The duration of the longer discharge pulse may be chosen to be shorter than a shortest duration of a cycle of one of the N switched-mode converter circuits of a PFC circuit. The duration of the shorter discharge pulse (first discharge pulse E1 in this example) may be chosen to be shorter than the Nth part of the shortest duration of a cycle of one of the N switched-mode converter circuits of a PFC circuit.

Figure 8:
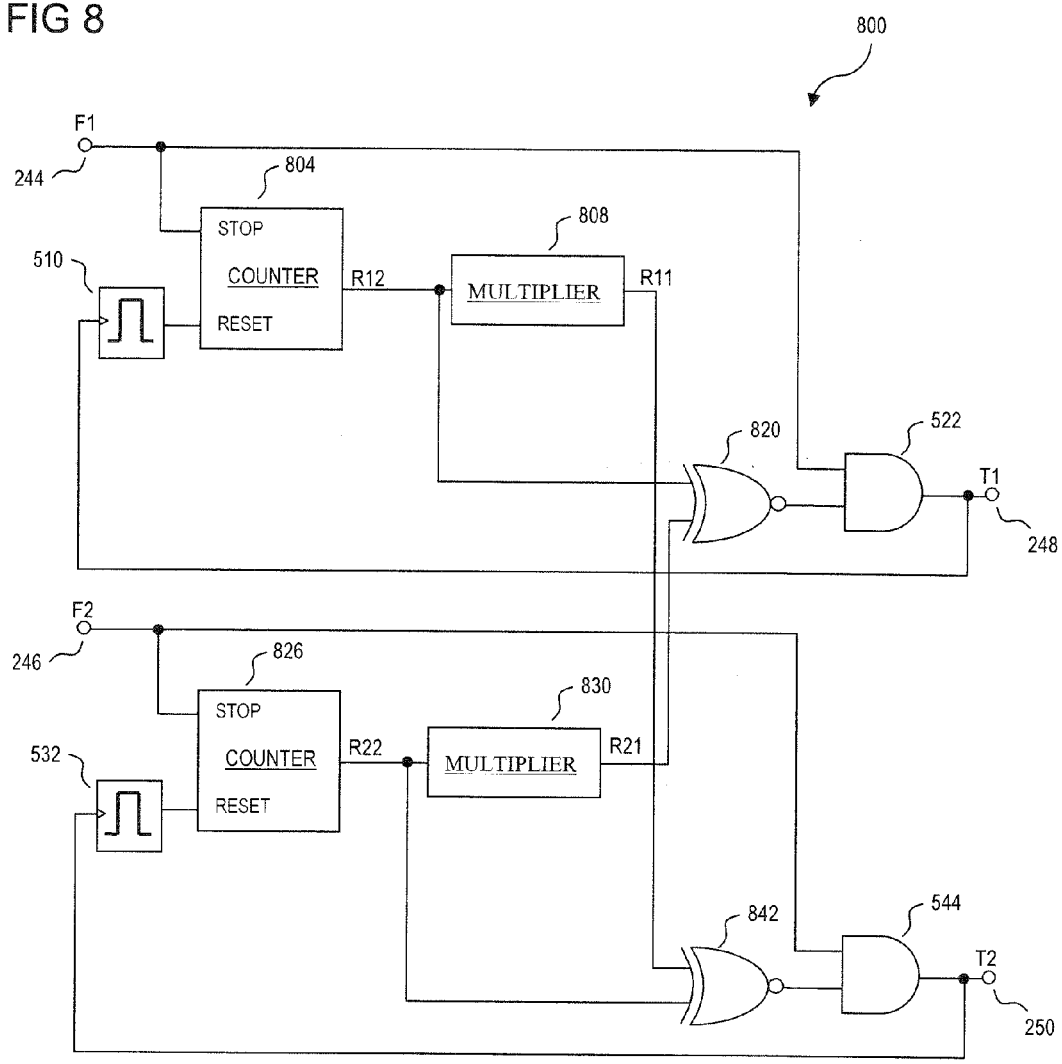
FIG. 8 shows a digital implementation of a ramp generation circuit within the control circuit according to various embodiments.

According to various embodiments of the PFC circuit, the ramp generation circuit 500 may be provided as a digital implementation 800, as depicted in FIG. 8. In such a case, the digital ramp generation circuit may have N digital counters 804, 826, each one allocated to a single one of the N converter circuits. A reset of each digital counter is synchronised with the generation of the output signal by a corresponding pulse generator 510, 532 (which may be equivalent to a synchronisation of the reset of a digital counter with the trigger signal output by a corresponding branch of the control circuit). After the reset, a respective counter 804 or 826 begins to count. The transition between a reset of a respective counter and the beginning of its operation may be done in consecutive cycles, hence a compensation mechanism for the rest process in the analog implementation which was explained with respect to FIGS. 6A to 6C is not required. The ramp signals R12 and/or R22, for example (ramp signals having "normal" slew-rates as compared to ramp signals R11 and R21 which are ramp signals with double slew-rate), may correspond to digital data words produced by the counters 804, 826, the ramp signals R11 and R21 may be obtained by the multipliers 808, 830, which multiply the digital words representing the ramp signals R12 and/or R22 by N, with N being the number of phases of the PFC circuit. In the case of N being a power of 2 the multiplication is straightforward. In the case of N not being a power of 2, the multiplication may be realized with a simple addition. The comparison of the ramp signals (e.g. R11 to R22 or R12 to R21 in the case of a two-phase PFC circuit, where N=2) may be implemented via digital comparators. For example, a comparison may be implemented with XNOR-gates 820, 842 (comparison yields true if both digital words are equal), if sufficiently enough least significant bits of the digital word R12 or R22 corresponding to the ramp signal with the normal slew-rate are omitted (or rounded) in order for the comparator to also reliably yield true when ramp signal R21 or R11 intersect ramp signals R11 or R22. Otherwise the digital comparator requires a subtractor in case it needs to be configured to detect which of the two digital words to be compared is bigger and which is smaller. When a respective memory element is set, as it is the case for example at time t7 or time t10 in diagram 326 in FIG. 4G for the second memory element 226, the counting process in a corresponding counter 804 or 826 may be stopped or a latch coupled downstream saves the state of the corresponding counter, i.e. its digital data word, and stores it.

A digital implementation may be advantageous when the signals G1, G2 output by the pulse generators are generated by means of digital counters. A common digital counter may be used for generating the signal pulses output by the pulse generators and for synchronising the phase as described in this application.

In FIGS. 4A to 4K exemplary pulse sequences of a two-phase PFC circuit have been shown where one converter circuit has a faster turn-on time than the other. In such a case, wait times are introduced in the operation of the faster converter while the slower converter circuit operates without wait times in order to establish out of phase operation of the two converter circuits. In that context it was also mentioned that, for example, durations of the pulses generated by the pulse generator may be adjusted (i.e. shortened or prolonged) in an iterative process. A schematic of a viable implementation of a correction circuit for adjusting the durations of the pulse signals generated by the pulse generators in dependence of the wait times is presented in FIG. 7.

In general, a wait time in the context of the PFC circuit according to various embodiments is defined by a state where the memory element is set, i.e. the corresponding threshold detector has detected a complete demagnetization of the corresponding inductor and correspondingly the signal output by the memory element is set to a high value, but the pulse generator has not yet generated a pulse. In other words, a wait time is defined by a state of the PFC circuit in which the first condition is met, but the second condition not. The situation just described is for example represented FIGS. 3G and 3H, where second memory element 226 is set at time t2 (hence the signal F2 in diagram 326 in FIG. 3G is set to its high value) and remains set until the trigger signal T2 is output by the control circuit 240 at time t3 in diagram 330 in FIG. 3H. The trigger signal T2 in turn resets the second memory element 226 (hence the signal F2 returns to zero at time t3 in diagram 326 in FIG. 3G). As previously described, the wait time in this given example corresponds to the time span between times t2 and t3. Usually, a respective memory element remains set for a very short time as it is immediately reset by the signal pulse output by a corresponding pulse generator. This situation can be observed by inspecting the shape of the signal F1 from the first memory element 126 in diagram 308 in FIG. 3C for example at time t1, where the signal F1 appears as a sharp peak 350, since is set and reset at the same time (neglecting switching times and transmission times). Therefore, in generalization of the exemplary signal sequences shown in FIGS. 3A to 3K, the duration of a respective memory element being set is a direct indicator of an involved wait time for a corresponding converter circuit (under the assumption of very short set times which then may be neglected).

One underlying idea for the correction circuit is to accumulate or average over the wait times for each converter circuit prior to comparison thereof. Alternatively, the wait times can be compared and the resulting difference can be accumulated or compared.

In the case of a two-phase PFC circuit, the correction circuit 700 may include a first subtractor 702. The first subtractor 702 may have a first input coupled to the second input 244 of the control circuit 240 and a second input coupled to the third input 246 of the control circuit 240. An output of the first subtractor 702 may be coupled to an integrator 704. An output of the integrator 704 may be coupled to first input of an adder 706 and to a first input of a second subtractor 708. The signal R provided at the first input 242 of the control circuit 240 may be coupled to a second input of the adder 706 and to a second input of the second subtractor 708. An output of the adder 706 may be coupled to the first output 252 of the control circuit 240 to be provided thereat and an output of the second subtractor 708 may be coupled to the second output 254 of the control circuit 240 to be provided thereat.

The first subtractor 702, being supplied with the signals F1 and F2 from the first memory element 126 and the second memory element 226 is configured to subtract the signal F2 from the second memory element 126 from the first signal of first memory element 226. In other words, the signal from each of the two memory elements is compared, wherein one of the two signals is attributed a negative sign. The result of the comparison is passed on to the integrator which provides an averaged difference between wait times of the two converter circuits to the adder 706 and the second subtractor 708. That averaged difference is used to form a modulation signal. The modulation signal M1 provided by the adder 706 is formed by adding the averaged difference to the control signal R, whereas the modulation signal M2 provided by the second subtractor 708 is formed by subtracting the averaged difference from the control signal R. If more than two converter circuits are provided in a PFC circuit according to various embodiments, multiple integrators are required.

Figure 7:
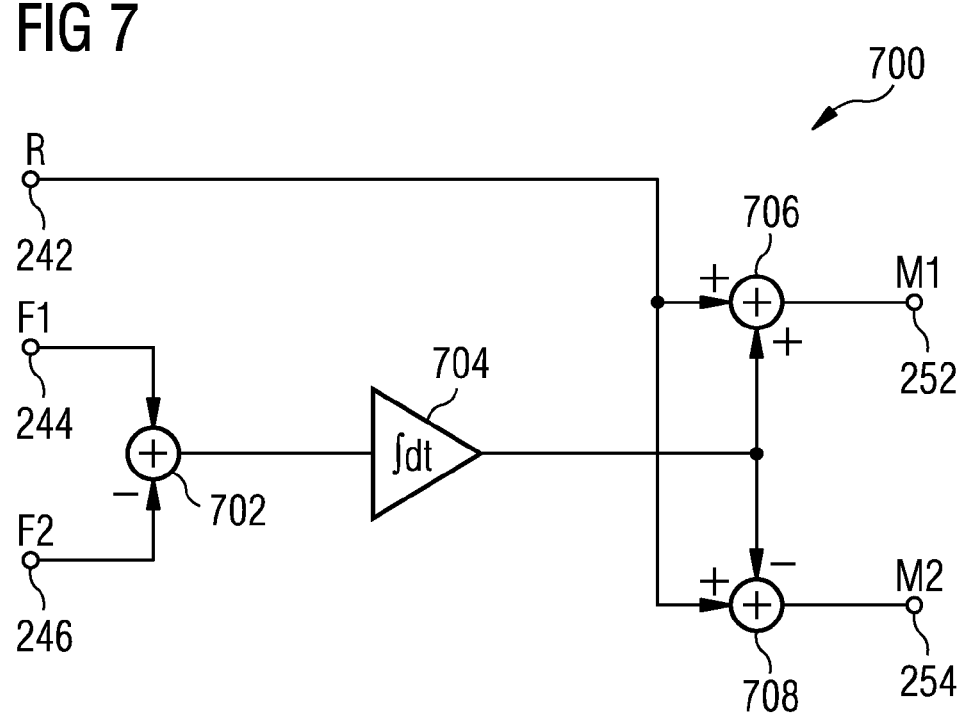
FIG. 7 shows an implementation of a correction circuit of the control circuit for adjusting turn-on times according to various embodiments.

The role of the minuend signal and subtrahend signal provided to the first subtractor 702 is arbitrary and can be inverted. However, when the signals at the first adder 702 are inverted, the adder 706 and the second subtractor 708 have to be replaced by one another as well, since the configuration displayed in FIG. 7 is such that the duration of the turn-on time of the inductor of the converter circuit with more and/or longer wait times is prolonged whereas the duration of the turn-on time of the inductor of the converter circuit with less and/or shorter wait times is reduced.

The PFC circuit according to various embodiments may include a first switched-mode converter circuit having a first inductor, at least one second switched-mode converter circuit having a second inductor, a control circuit coupled to the first and second switched-mode converter circuits, wherein the control circuit is configured to start a switching pulse for the second switched-mode converter circuit when the following conditions are fulfilled:
the second inductor of the second switched-mode converter circuit has a predefined magnetization state, and
a predefined time period has elapsed since the start of a switching pulse for the first switched-mode converter circuit,
wherein the predefined time period is a predefined fraction of the time period from the start of a previous switching pulse for the second switched-mode converter circuit to a time when the second inductor of the second switched-mode converter circuit has the predefined magnetization state. In this context the switched-mode converter circuit has a predefined magnetization state means that the switched-mode converter circuit enters the predefined magnetization state from another magnetization state which does not correspond to the predefined magnetization state.

In accordance with various embodiments of the PFC circuit, the predefined magnetization state may correspond to a magnetization state in which the second inductor is completely demagnetized.

In accordance with various embodiments of the PFC circuit the predefined fraction of the time period is 1/N, wherein N denotes the number of switched-mode converter circuits provided in the PFC circuit.

In accordance with various embodiments of the PFC circuit the control circuit may be further configured to start a switching pulse for the first switched-mode converter circuit when the following conditions are fulfilled:
the first inductor of the first switched-mode converter circuit has a predefined magnetization state; and
a further predefined time period has elapsed since the start of a switching pulse for the second switched-mode converter circuit,
wherein the further predefined time period is a predefined fraction of the time period from the start of a previous switching pulse for the first switched-mode converter circuit to a time when the first inductor of the first switched-mode converter circuit has the predefined magnetization state.

In another embodiment the PFC circuit may further include at least one third switched-mode converter circuit including a third inductor; wherein the control circuit is also coupled to the third switched-mode converter circuit.

In accordance with various embodiments of the PFC circuit at least one of the first switched-mode converter circuit and the second switched-mode converter circuit may include an auxiliary inductor inductively coupled to the respective inductor and a threshold detector coupled to the auxiliary inductor.

In accordance with various embodiments of the PFC circuit at least one of the first switched-mode converter circuit and the second switched-mode converter circuit may include a memory element configured to store a signal provided by the threshold detector and a pulse generator coupled to an output of the memory element.

In accordance with various embodiments of the PFC circuit the pulse generator may be configured as a pulse width modulator.

In accordance with various embodiments of the PFC circuit at least one of the first switched-mode converter circuit and the second switched-mode converter circuit may include a switch, a control input of which is coupled to an output of the pulse generator.

In accordance with various embodiments of the PFC circuit an output of the pulse generator may be coupled to an input of the memory element.

In accordance with various embodiments of the PFC circuit the memory element may include a flip-flop. According to further embodiments of the PFC circuit, the flip-flop may include an RS-flip-flop.

In accordance with various embodiments of the PFC circuit the output of the pulse generator may be coupled to a reset input of the RS-flip-flop.

In accordance with various embodiments of the PFC circuit the control circuit may be coupled between an output of the memory elements of the first and second switched-mode converter circuits and input of the pulse generators.

In accordance with various embodiments of the PFC circuit the control circuit may further include at least one arrangement comprising a switchable current source and a capacitor coupled to the switchable current source.

In accordance with various embodiments of the PFC circuit each of the first switched-mode converter circuit and the second switched-mode converter circuit may be coupled to at least one arrangement.

In accordance with further various embodiments of the PFC circuit a ratio between a current provided by the current source and a capacitance of the capacitor of the first arrangement of any one of the switched-mode converter circuits may be N times as large as a ratio between a current provided by the current source and a capacitance of the capacitor of a second arrangement of that same switched-mode converter circuit.

In yet another embodiment of the PFC circuit the capacitor of the first arrangement of any one of the switched-mode converter circuits and the capacitor of the second arrangement of that same switched-mode converter circuit may have the same capacitance and the current source of the first arrangement of that same switched-mode converter circuit may be configured to deliver a current N times as large as the current delivered by second current source of the second arrangement of that same switched-mode converter circuit, wherein N denotes the number of switched-mode converter circuits provided in the power factor correction circuit.

In yet another embodiment of the PFC circuit the capacitance of the capacitor of the second arrangement of any one of the switched-mode converter circuits may be N times as large as the capacitance of the capacitor of the first arrangement of that same switched-mode converter circuit, wherein N denotes the number of switched-mode converter circuits provided in the power factor correction circuit, and the current source of the second arrangement of that same switched-mode converter circuit may be configured to deliver the same current as the current source of the first arrangement of that same switched-mode converter circuit.

In accordance with various embodiments of the PFC circuit the current source of the at least one arrangement coupled to the second switched-mode converter circuit may be configured to be switched depending on the signal stored in the memory element of the second switched-mode converter circuit.

In accordance with various embodiments of the PFC circuit the current source of the at least one arrangement coupled to the second switched-mode converter circuit may be configured to be switched off when the second inductor of the second switched-mode converter circuit has entered the predefined magnetization state.

In accordance with further various embodiments of the PFC circuit the controller is configured to compare a ramp signal generated by the arrangement of the first switched-mode converter circuit to a ramp signal generated by the arrangement of the second switched-mode converter circuit in order to determine whether a second condition is fulfilled, wherein the second condition is fulfilled, when the predefined time period has elapsed since the start of the switching pulse for the first switched-mode converter circuit.

In accordance with various embodiments of the PFC circuit the control circuit may be configured to adjust durations of the switching pulses for at least one of the first switched-mode converter circuit and the second switched-mode converter circuit based on a wait time which is defined by the time during which a first condition is fulfilled and a second condition is not fulfilled for a respective switched-mode converter circuit, wherein the first condition is fulfilled when the inductor of the respective switched-mode converter circuit has a predefined magnetization state and the second condition is fulfilled when the predefined time period has elapsed since the start of the switching pulse for the other switched-mode converter circuit.

In accordance with various embodiments of the PFC circuit the control circuit may be configured to prolong the duration of the switching pulse for the switched-mode converter circuit for which on average the wait times are the longest.

In accordance with various embodiments of the PFC circuit the control circuit may be configured to decrease the duration of the switching pulse for the switched-mode converter circuit for which on average the wait times are the shortest.

In accordance with various embodiments of the PFC circuit the control circuit may include a subtractor configured to form the difference between the signal provided at the output of the first memory element and the signal provided at the output of the second memory element and an integrator coupled downstream to the subtractor configured to integrate the difference.

In accordance with various embodiments of the PFC circuit the control circuit may include a circuit configured to provide the difference between a reference signal and the integrated difference provided by the integrator at a second output, and to provide a sum of the reference signal and the integrated difference provided by the integrator at a first output, wherein the first output may be coupled to an input of the pulse generator of the first switched-mode converter circuit and wherein the second output may be coupled to an input of the pulse generator of the second switched-mode converter circuit.

In accordance with further various embodiments of the PFC circuit the control circuit may include at least one digital counter which is configured to initiate a counting process starting from a predefined counter value upon a generation of the switching pulse within the respective switched-mode converter circuit, wherein each of the at least one digital counters is exclusively allocated to one switched-mode converter circuit.

In accordance with further various embodiments of the PFC circuit the control circuit may be configured to compare two digital values in order to determine whether the second condition is satisfied, wherein the first digital value corresponds to the current counter value of the counter of the first switched-mode converter circuit and the second digital value corresponds to the counter value of the counter of the second switched-mode converter circuit at a time when the second inductor entered the predefined magnetization state and wherein the second condition is satisfied when the predefined time period has elapsed since the start of a switching pulse for the first switched-mode converter circuit.

According to further various embodiments a PFC circuit is provided which may include a first switched-mode converter circuit, a second switched-mode converter circuit, a control circuit coupled to the first and second switched-mode converter circuits, wherein the control circuit may be configured to allow a current flow through second switched-mode converter circuit when the following conditions are fulfilled:

the current flow through the second switched-mode converter circuit has decreased to a predefined value, and a predefined time period has elapsed since the start of a switching pulse for the first switched-mode converter circuit,
wherein the predefined time period may be a predefined fraction of the time period from the start of a previous switching pulse for the second switched-mode converter circuit to a time when the current flow through the second switched-mode converter circuit has decreased to a predefined value.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for operating a power factor correction circuit comprising the steps of:
providing a plurality of N switched-mode converter circuits each comprising an nth inductor, where N is at least 2;
starting a switching pulse for the nth switched-mode converter circuit when the following conditions are fulfilled:
the nth inductor of the nth switched-mode converter circuit has a predefined magnetization state; and
a predefined time period has elapsed since the start of a switching pulse for an mth switched-mode converter circuit, where m=n−1 in case n>1 and m=N in case n=1,
wherein the predefined time period is a predefined fraction of the time period from the start of a previous switching pulse for the nth switched-mode converter circuit to a time when the nth inductor of the nth switched-mode converter circuit has the predefined magnetization state.

2. The method of claim 1,
wherein the predefined magnetization state is a magnetization state in which the nth inductor of the nth switched-mode converter circuit is completely demagnetized.

3. The method of claim 1,
wherein the predefined fraction of the time period is 1/N.

4. The method of claim 1,
wherein N is at least 3.

5. The method of claim 1,
wherein at least one of plurality of switched-mode converter circuits further comprises:
an auxiliary inductor inductively coupled to the respective inductor, and
a threshold detector coupled to the auxiliary inductor.

6. The method of claim 5,
wherein at least one of the plurality of switched-mode converter circuits further comprises:
a memory element configured to store a signal provided by the respective threshold detector, and
a pulse generator coupled to an output of the memory element.

7. The method of claim 6,
wherein the pulse generator is configured as a pulse width modulator.

8. The method of claim 6,
wherein at least one of the plurality of switched-mode converter circuits comprises a switch, a control input of which is coupled to an output of the pulse generator.

9. The method of claim 6,
wherein the memory element comprises a flip-flop.

10. The method of claim 6, further comprising:
coupling a control circuit to each of the plurality of N switched-mode converter circuits;
wherein the control circuit starts the switching pulse for respective switched-mode converter circuit.

11. The method of claim 10, further comprising:
coupling the control circuit between an output of the memory element and an input of the pulse generator.

12. The method of claim 10,
wherein the control circuit comprises:
at least one arrangement comprising a switchable current source and a capacitor coupled to the switchable current source.

13. The method of claim 12, further comprising:
coupling each of the plurality of switched-mode converter circuits to the at least one arrangement.

14. The method of claim 13,
wherein the nth switched-mode converter circuit comprises the memory element; and
wherein the current source of the at least one arrangement is configured to be switched depending on the signal stored in the memory element of the nth switched-mode converter circuit.

15. The method of claim 13, further comprising:
switching off the current source of the at least one arrangement when the nth inductor of the nth switched-mode converter circuit has entered the predefined magnetization state.

16. The method of claim 13, further comprising:
coupling the nth switched-mode converter circuit to a further arrangement comprising a switchable current source and a capacitor coupled to the switchable current source; and
comparing a ramp signal generated by the arrangement of the mth switched-mode converter circuit to a ramp signal generated by the arrangement of the nth switched-mode converter circuit in order to determine whether a second condition is fulfilled, wherein the second condition is fulfilled when the predefined time period has elapsed since the start of the switching pulse for the mth switched-mode converter circuit.

17. The method of claim 12,
wherein the control circuit comprises a second arrangement comprising a capacitor; and
wherein a ratio between a current provided by the current source and a capacitance of the capacitor of the at least one arrangement is N times as large as a ratio between a current provided by the current source and a capacitance of the capacitor of the second arrangement.

18. The method of claim 10,
wherein the control circuit further comprises:
a second memory element;
a subtractor configured to form the difference between a signal provided at the output of the memory element and a signal provided at the output of the second memory element; and
an integrator coupled downstream to the subtractor configured to integrate the difference.

19. The method of claim 18, further comprising:
computing the difference between a reference signal and the integrated difference provided by the integrator at a second output, and to provide a sum of the reference signal and the integrated difference provided by the integrator at a first output;

wherein the first output is coupled to an input of a pulse generator of the mth switched-mode converter circuit; and wherein the second output is coupled to an input of a pulse generator of the nth switched-mode converter circuit.

20. The method of claim 1, further comprising:

adjusting durations of the switching pulses for at least one of the plurality of switched-mode converter circuits based on a wait time which is defined by the time during which a first condition is fulfilled and a second condition is not fulfilled for a respective switched-mode converter circuit, wherein the first condition is fulfilled when the inductor of the respective switched-mode converter circuit has a predefined magnetization state and the second condition is fulfilled when the predefined time period has elapsed since the start of the switching pulse for the other switched-mode converter circuit.

21. The method of 20, further comprising:

prolonging the duration of the switching pulse for the switched-mode converter circuit for which on average the wait times are the longest.

22. The method of claim 20, further comprising:

decreasing the duration of the switching pulse for the switched-mode converter circuit for which on average the wait times are the shortest.

23. The method of claim 10, wherein the control circuit comprises a plurality of digital counters which are configured to initiate a counting process starting from a predefined counter value upon a generation of the switching pulse within the respective switched-mode converter circuit, wherein each of the plurality of digital counters is exclusively allocated to one switched-mode converter circuit.

24. The method of claim 23, further comprising:

comparing two digital values in order to determine whether a second condition is satisfied, wherein the first digital value corresponds to the current counter value of the counter of the mth switched-mode converter circuit and the second digital value corresponds to the counter value of the counter of the nth switched-mode converter circuit at a time when the nth inductor entered the predefined magnetization state and wherein the second condition is satisfied when the predefined time period has elapsed since the start of a switching pulse for the mth switched-mode converter circuit.

25. A method for operating a power factor correction circuit comprising the steps of:

providing a plurality of N switched-mode converter circuits each comprising an nth inductor, where N is at least 2;

allowing a current flow through the nth switched-mode converter circuit when the following conditions are fulfilled:
  the current flow through the nth switched-mode converter circuit has decreased to a predefined value; and
  a predefined time period has elapsed since the start of a switching pulse for an mth switched-mode converter circuit, where m=n−1 in case n>1 and m=N in case n=1, wherein the predefined time period is a predefined fraction of the time period from the start of a previous switching pulse for the nth switched-mode converter circuit to a time when current flow through the nth switched-mode converter circuit has decreased to a predefined value.

* * * * *